United States Patent [19]

Butler

[11] Patent Number: 4,559,926
[45] Date of Patent: Dec. 24, 1985

[54] CENTERLESS-DRIVE SOLAR COLLECTOR SYSTEM

[76] Inventor: Barry L. Butler, 13525 Portofino Dr., Delmar, Calif. 92014

[21] Appl. No.: 657,187

[22] Filed: Oct. 3, 1984

[51] Int. Cl.⁴ .............................................. F24J 3/02
[52] U.S. Cl. ..................... 126/438; 126/425; 250/203 R; 350/628
[58] Field of Search .............. 126/438, 439, 425; 350/289, 310, 637, 611, 287, 628, 631; 250/203 R

[56] References Cited

U.S. PATENT DOCUMENTS

| | | | |
|---|---|---|---|
| 2,205,378 | 6/1940 | Abbot | 126/438 X |
| 4,077,392 | 3/1978 | Garner | 126/438 X |
| 4,106,484 | 8/1978 | Dame | 126/438 |
| 4,107,521 | 8/1978 | Windors | 126/425 X |
| 4,136,671 | 1/1979 | Whiteford | 126/438 |
| 4,245,616 | 1/1981 | Wyland | 126/438 X |
| 4,249,515 | 2/1981 | Page | 126/438 |
| 4,343,533 | 8/1982 | Currin et al. | 126/438 X |
| 4,432,345 | 2/1984 | McIntire | 126/443 X |

*Primary Examiner*—Larry Jones

[57] ABSTRACT

A parabolic-trough solar collector system is disclosed, with each collector driven to track the sun using a ring driven in centerless fashion. The parabolic troughs are made of laminated plywood or molded or formed of plastics or metals. The drive motor moves a flexible belt, i.e., chain or cable, which is routed about the drive ring on each collector. The motion of the cable moves all drive rings together to track the sun. A photodetector senses the position of the sun and provides the signal needed to drive the collectors in the correct direction.

7 Claims, 11 Drawing Figures

CENTERLESS-DRIVE SOLAR COLLECTOR SYSTEM

BACKGROUND OF THE INVENTION

This invention pertains to the structure and tracking of an array of parabolic-trough solar collectors. Parabolic-trough collectors can deliver higher temperatures than flat-plate systems. Parabolic-trough, single-axis tracking systems of 10 to 20 times concentration can operate at 212 to 350 degrees F. Flat-plate collectors operating at the same efficiency and insolation levels operate between 140 and 212 degrees F. The higher operating temperatures of the parabolic collectors make them much more efficient at solar cooling using desiccants, vapor compression, and sorption chillers. The higher temperatures are also easier to connect to conventional hot water heat, which usually use a boiler output water temperature of 180 degrees F.

The prior art contains a number of examples of methods for simultaneously rotating a parallel array of solar collectors. One common technique uses a pulley on one end of each collector. A continuous cable connecting all of the pulleys causes each of the collectors to rotate in unison. See, for example, U.S. Pat. No. 4,245,616, "Solar Tracking Device" of Wyland, issued Jan. 20, 1981. Somewhat different arrangements of this general concept are shown in U.S. Pat. No. 4,284,063, "Solar Power Generating System" of Watson, issued Aug. 18, 1981; and U.S. Pat. No. 4,114,594, "Device for Synchronously Rotating Solar Collectors" of Meyer, issued Sept. 19, 1978. However, none of these prior art references disclose or teach use of a large drive wheel supported by dolly wheels to not only overcome the tracking problems discussed in these references, but also to provide structural support for the collectors.

SUMMARY OF THE INVENTION

The primary object of the present invention is combination of the centerless-drive tracking system with an array of lowstrength collectors.

Another object of the invention is to provide a solar collector system built with a minimum number of inexpensive standard components.

An additional benefit of the present invention is use of a single low-cost motor and a cable-driven, centerless-drive tracker to drive multiple rows of collectors. A pivot point is provided at each end of the collector. The drive ring is usually located in the middle of the collector and is supported by a pair of dolly wheels. The rotation axis is formed by the ring center and the pivot points on each end of the collector. Each parabolic reflector and receiver tube assembly is thus supported at multiple points in addition to pivot points at both ends of the collector. This allows use of inexpensive, low-strength material due to the resultant low wind and tracking stresses applied to the reflectors. One major cost factor in movable solar collectors is attributed to the strength which must be imparted to each collector. The prior art of collector systems has been based on pivoting collectors about a single axis. This concentrates the wind and gravity loads on the axis. In contrast, the centerless-drive approach distributes the loads to the drive ring and dolly wheels as well as to the pivots on each end to the collector. This allows the wind and gravity loads to be more easily resisted with inexpensive, low-strength materials. The dolly wheels allow the drive ring to rotate 360 degrees while supporting the load of the collector. This also allows the collectors to face the ground during inclement weather. Pivot points could be replaced by additional driven or non-driven rings supported by dolly wheels, thus further increasing the number of support points.

An array of low-strength plywood parabolic troughs can be constructed from laminated wood veneers and surfaced with countertop "Melamine" or "Formica" type high-pressure laminates. The smooth, waterproof, high-pressure laminate protects the wooden core and provides a smooth surface for attaching the reflector material. Other low-strength parabolic troughs made of fiberglass, sheet metal, particle board, chipboard, or sheet plastics could also be used. Alternate laminated cross-sectional shapes could also be used.

A novel sun tracker, based on light-activated, silicon-controlled rectifiers (LASCR), is also disclosed. A pair of LASCRs placed in a shadow-band configuration provide the on/off electrical signals to the drive motor to track the sun. Reverse biasing of the LASCRs allows the light level needed for electrical switching to be adjusted. Thus, balancing of the LASCRs is possible and allows accurate sensing of the position of the sun.

Additional objects, advantages, and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

DESCRIPTION OF THE DRAWINGS

FIG. 8 is a larger scale view of the cross-section of the receiver tube assembly shown in FIG. 7, also showing the cross-section of the parabolic-trough collector.

DETAILED DESCRIPTION OF THE PREFERRED EMBODIMENT

Figure 1:
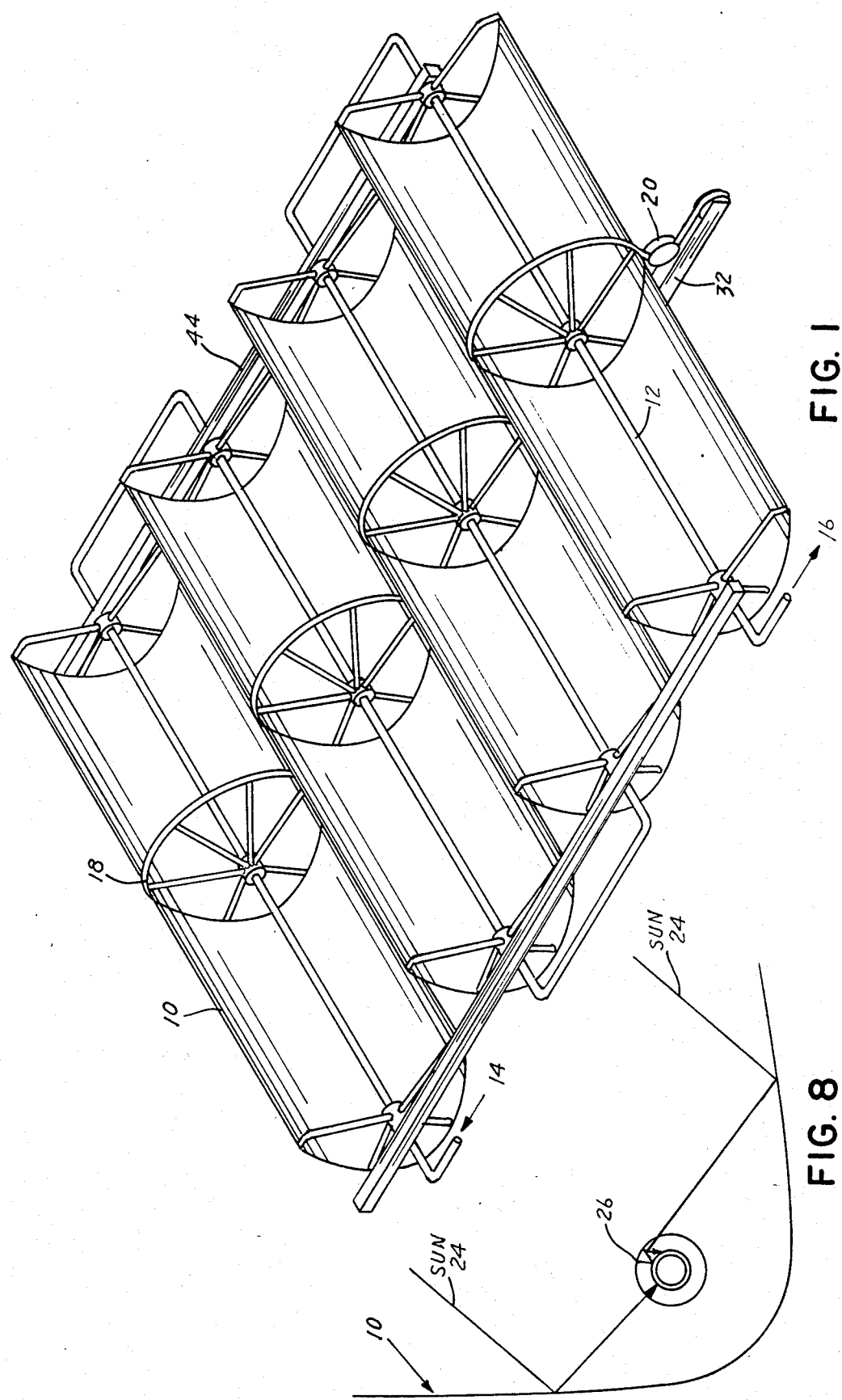
FIG. 1 is a perspective view of the entire array showing the collectors and tracking system of the invention.

Referring now to the drawings and especially to FIG. 1, a solar collector array is shown, comprising a plurality of parabolic reflectors 10, which concentrate solar radiation on a receiver pipe 12. The heat is removed by circulating a cooling fluid through the inlet 14 and outlet 16. The axis of rotation of the reflector is centered at the receiver pipe, which is also the focal line of the reflector. The collectors rotate simultaneously about their respective axes to track the sun. Drive rings 18 are supported on dolly wheels 20.

The collectors can either be oriented in a generally north-south direction, or in an east-west direction. In either case, the performance of the collectors can be substantially improved by allowing a second axis of rotation for the frame to which each of the collectors is mounted. For example, if the collectors have a north-south orientation, the frame can be pivoted or tilted about on an east-west axis to compensate for seasonal variation in the elevation of the sun. On the other hand, if the collectors have an east-west orientation, the frame can be rotated about a vertical axis to compensate for apparent movement of the sun from east to west during the course of each day.

The parabolic trough reflectors shown in FIG. 1 can be formed using low-strength, low-cost materials due to this added structural support. Cross-plies of thin wood veneer are separated by layers of glue. The top and bottom layers are smooth sheets of laminate, such as "Melamine" or "Formica." The entire assembly is then die-molded under pressure and heat to cure the glue and form the desired parabolic cross-sectional shape. A self-adhesive reflective film or tape is then applied to the top surface of the laminate.

Figure 2:
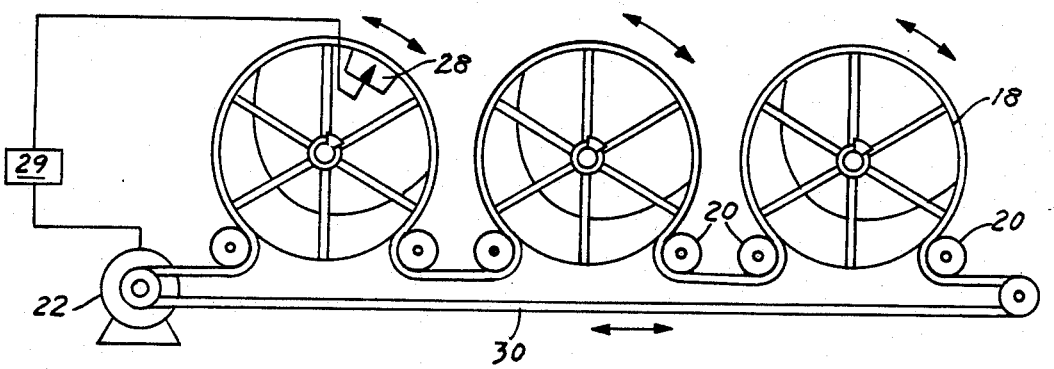
FIG. 2 is an end view of the drive system, showing the drive motor and drive rings.

FIG. 2 shows the detail of the drive ring 18. The reflector is attached to the drive ring such that the focus is at the center of rotation. Thus, the rays of the sun 24 are reflected by the parabolic trough to the receiver pipe directly, or they bounce off the "V-shaped" secondary reflector 26. The sun sensor 28 provides the sun position to the control box 29. The drive motor 22 then moves the drive belt, cable or chain 30, and thus all collectors point at the sun. The collector weight is supported by the dolly wheels 20, which are attached to a central support or frame and the collector and pivots.

Figure 3:
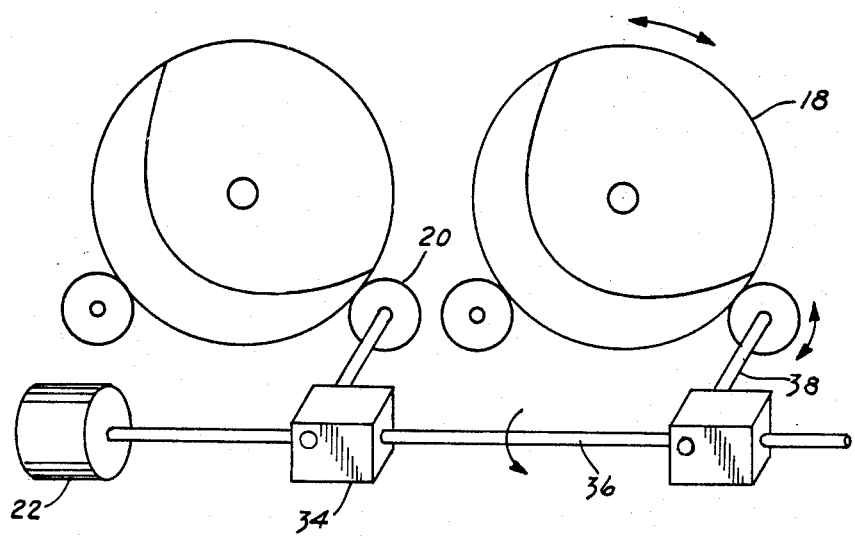
FIG. 3 shows an alternative drive system using a drive shaft and boggie wheel to drive each collector.

FIG. 3 shows an alternative to FIG. 2 where the drive motor activates a gear box 34 with main drive shaft 36 and boggie drive shafts 38, with power boggie wheels 20, which rotate the drive rings 18 either by friction or by gear teeth.

Figure 4:
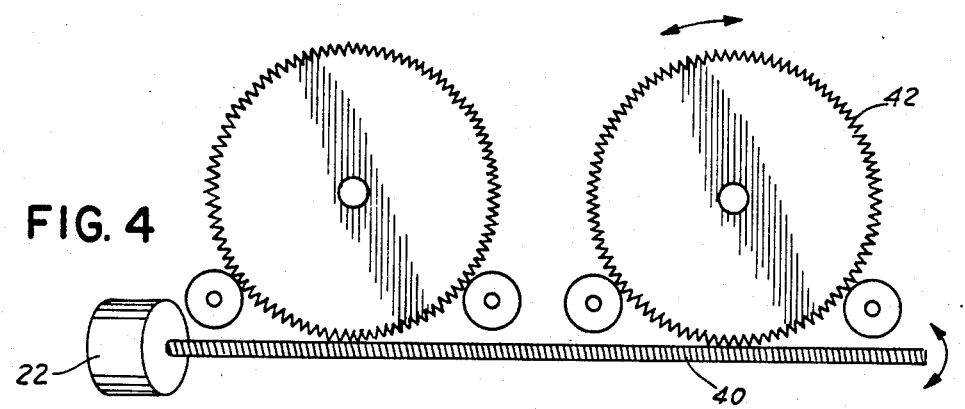
FIG. 4 shows an alternative drive system using a lead screw and circular rack.

FIG. 4 shows another alternative to FIG. 2 where the drive motor 22 powers a lead screw 40; and each drive ring has a mating rack gear 42, causing all collectors to move simultaneously as the lead screw is turned by the motor.

Figure 5:
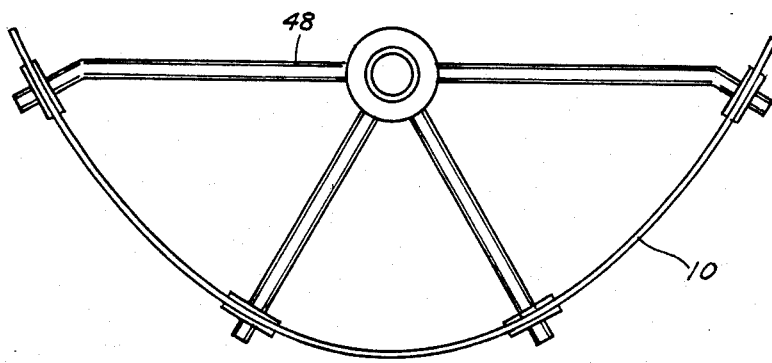
FIG. 5 shows the end pivot of the collector.
Figure 9:
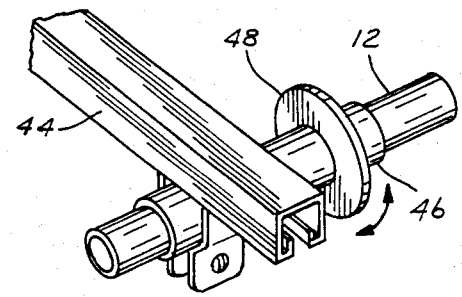
FIG. 9 is a detail perspective view of the end of a receiver tube assembly showing the manner in which it is secured to the frame.
Figure 11:
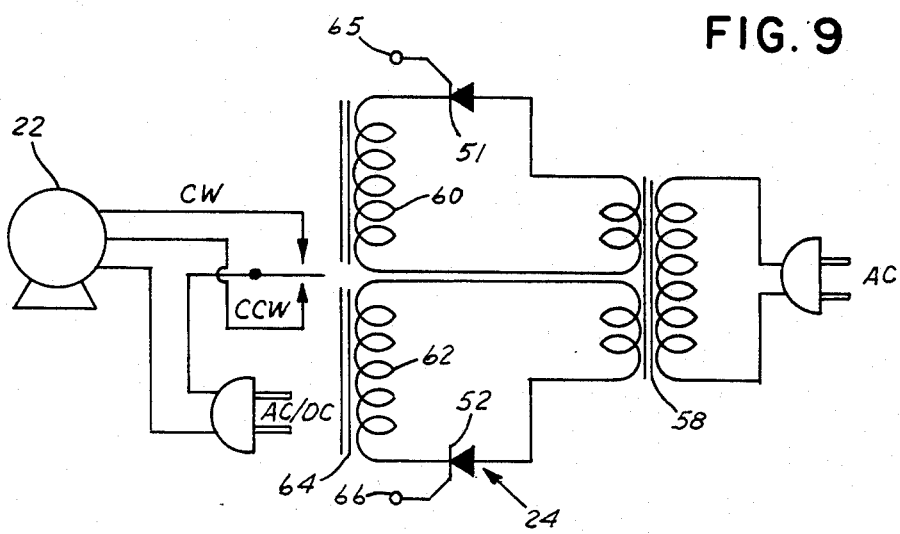
FIG. 11 is an electrical schematic for the LASCR sun sensor and motor control.

FIG. 5 shows the end support for the trough. Rods, plate or sheet material can be used as end supports 48 for the parabolic reflector 10. As further shown in FIG. 9 and FIG. 6, the bearing pipe 46 is supported by the frame 44. The receiver pipe 12 passes through the bearing pipe 46. This arrangement allows the receiver tube to remain stationary while the parabolic reflector rotates to track the sun.

Figure 6:
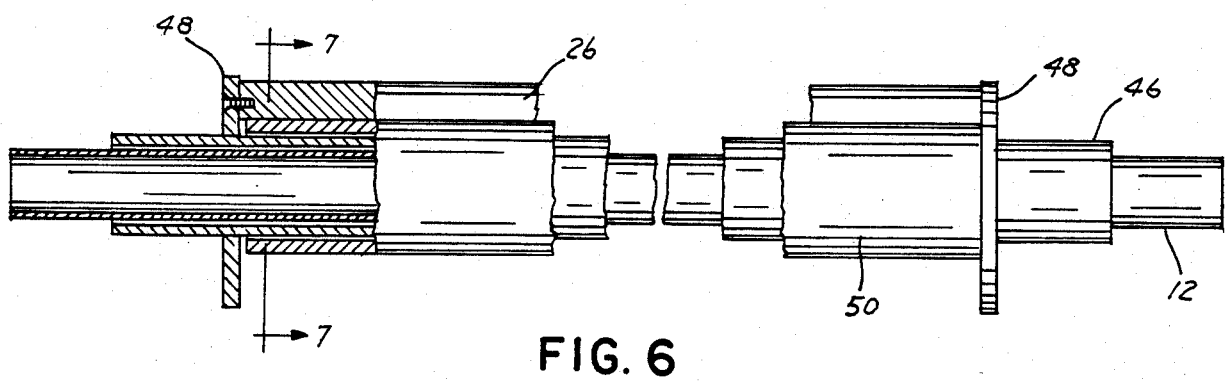
FIG. 6 is a sectional view showing the receiver pipe, secondary reflector, and transparent receiver pipe cover.

FIG. 6 shows a detailed view of the transparent receiver pipe cover tube 50 supported by the outside of the bearing tube 46. A secondary reflector 26 is attached to the exterior of the cover tube and so moves with the parabolic reflector.

Figure 7:
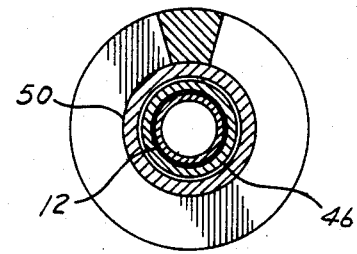
FIG. 7 is a cross-sectional view of the assembly shown in FIG. 6, taken along lines 7—7.
Figure 10:
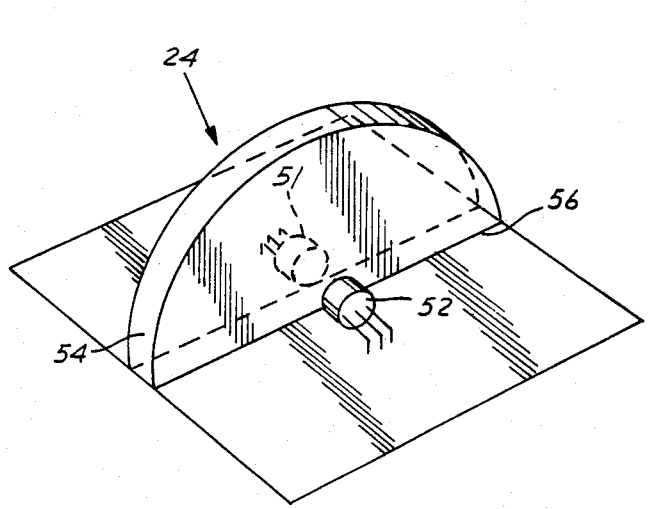
FIG. 10 shows the LASCR sun sensor, including the shadow panel.

FIG. 7 shows the shadow-band sun sensor. The shadow panel 54 turns on both LASCRs 51 and 52 to the same degree when the sun 24 falls uniformly on each. When the rays of the sun 24 fall on one LASCR because it is not in the shadow of the sun, while the other LASCR is in the shadow, then the LASCR in the sun will activate the drive motor 22 to move until both LASCRs are equally shadowed.

FIG. 8 shows a simple electrical schematic for the use of LASCRs 51 and 52 to control drive motor 22 rotation. Power is fed to the LASCRs from transformer 58, which also isolates the clockwise (CW) rotation LASCR 51 from the counterclockwise (CCW) rotation LASCR 52. When sunlight 24 illuminates LASCR 51, but not LASCR 52, LASCR 51 conducts activating coil 60 of motor relay 64, causing the motor to rotate clockwise. Similar operation of LASCR 52 and coil 62 causes counterclockwise rotation of the drive motor. If a bright cloud eliminates the shadow in the sun sensor and turns on both LASCRs 51 and 52, the motor relay 64 is still balanced and the motor does not turn. Reverse biasing of the LASCRs can be accomplished by placing a small biasing DC or phase shifted AC voltage on connections 65 and/or 66. Biasing of this type can be used to compensate for any difference in the operational characteristics of the LASCRs.

As noted above, the performance of the collectors can be improved by allowing rotation of the frame about a second axis. A second sun sensor, as described above, can be employed to control rotation about this second axis. Alternatively, in place of two separate sensors, a quadrant sensor using four LASCRs and two perpendicular shadow panels could be employed to control rotation of both the collectors and the frame.

The foregoing is considered as illustrative only of the principles of the invention. Further, since numerous modifications and changes will readily occur to those skilled in the art, it is not desired to limit the invention to the exact construction and operations shown and described, and accordingly all suitable modifications and equivalents may be resorted to, falling within the scope of the invention.

I claim:

1. A solar collector system comprising:
   (a) a frame;
   (b) a number of solar collectors, each collector mounted by pivots at both ends of the frame, so as to allow rotation of the collector about its longitudinal axis;
   (c) each collector having a drive ring attached thereto, the longitudinal axis of the collector perpendicular to the plane of the drive ring;
   (d) for each collector, dolly wheels rotatably attached to the frame, and supporting the drive ring;
   (e) a flexible belt routed over the drive ring and under the dolly wheels of each collector; and
   (f) drive means for simultaneously rotating the collectors by applying a rotational torque to the drive rings by means of the belt.

2. The solar collector system of claim 1, wherein the solar collector comprises:
   (a) a trough-shaped reflector having a parabolic cross-section and a focal line at the center of rotation of the drive ring;
   (b) a receiver tube located along the focal line of the reflector, said receiver tube supported at both ends by bearings that allow the receiver tube to remain stationary as the reflector rotates.

3. The solar collector system of claim 2, wherein the solar collector further comprises:
   (a) a cover tube surrounding the receiver tube, rotating with the reflector; and
   (b) a secondary reflector attached to the cover tube opposite the reflector, further concentrating light on the receiving tube that has been reflected by the reflector.

4. The solar collector system of claim 2, wherein said reflector comprises:
   (a) an assembly of cross-plies of wood veneer and a smooth top and bottom surface layers of high-pressure laminate; and
   (b) an adhesive reflective film applied to the top surface of said laminate.

5. The solar collector system of claim 1, further comprising a sun sensor to control the drive means, said sun sensor comprising:
   (a) a shadow panel attached to one of the collectors, mounted parallel to the longitudinal axis of the collector, extending in the desired orientation of the collector with respect to the sun; and
   (b) two LASCRs mounted on opposite sides of the shadow panel, said LASCRs providing an electrical signal to the drive means to maintain the desired orientation of the collectors with respect to the sun.

6. The solar collector system of claim 1, further comprising a sun sensor to control the drive means, said sun sensor comprising:
   (a) a shadow panel attached to one of the collectors, mounted parallel to the longitudinal axis of the collector, and extending in the desired orientation of the collector with respect to the sun;
   (b) a relay controlling the direction of the rotational torque produced by the drive means; and
   (c) two LASCRs mounted on opposing sides of the shadow panel, each of said LASCRs regulating a power supply capable of activating the relay to cause the drive means to maintain the desired orientation of the collectors with respect to the sun.

7. A solar collector system comprising:
   (a) a frame;
   (b) a number of trough-shaped reflectors having a parabolic cross-section; each reflector mounted to the frame by pivots at both ends to allow rotation of the reflector about its focal line;
   (c) a drive ring attached to each reflector, with the center of rotation of said drive ring located along the focal line of the reflector;
   (d) for each reflector, a number of dolly wheels attached to the frame, supporting the drive ring;
   (e) a flexible belt routed over the drive ring and under the dolly wheels of each reflector;
   (f) for each reflector, a receiving tube located along the focal line of the reflector; and
   (g) drive means for simultaneously rotating the reflectors by applying a rotational torque to the drive rings by means of the belt.

* * * * *